United States Patent [19]

Yamamoto et al.

[11] Patent Number: 5,262,631
[45] Date of Patent: Nov. 16, 1993

[54] COLOR IMAGE READING APPARATUS

[75] Inventors: Hiroyuki Yamamoto; Yoshiyuki Ichihara; Satoshi Haneda; Masakazu Fukuchi; Shisuo Morita, all of Hachioji, Japan

[73] Assignee: Konica Corporation, Tokyo, Japan

[21] Appl. No.: 736,498

[22] Filed: Jul. 26, 1991

[30] Foreign Application Priority Data

Aug. 10, 1990 [JP] Japan ................................. 2-212645
Aug. 10, 1990 [JP] Japan ................................. 2-212646

[51] Int. Cl.$^5$ ............................................. H04N 1/46
[52] U.S. Cl. ................................... 250/208.1; 358/500
[58] Field of Search ................. 250/208.1, 578, 211 J, 250/211 R, 226; 358/75; 355/326

[56] References Cited

U.S. PATENT DOCUMENTS

4,954,703  9/1990  Ohzu ................................ 250/208.1

Primary Examiner—David C. Nelms
Assistant Examiner—K. P. Hantis
Attorney, Agent, or Firm—Frishauf, Holtz, Goodman & Woodward

[57] ABSTRACT

A color scanner having two lines of CCD. One of the CCD line is used for scanning green image of a document, and another CCD line is used for scanning red and blue images of the document. In the CCD line for red and blue image scanning, red and blue filters are located alternatively on the pixel sensors in a lined shape. In order to obtain a pixel density corresponding to the red image and blue image as same as that to the green image, each of red and blue image signals is processed from two image signals. The color scanner is provided with a memory to store red and blue image signals so that those signals are processed with next-obtained red and blue image signals. The color scanner also includes a shift register to delay green image signals so that all of red, blue, and green image signals are carried out to a processor simultaneously.

4 Claims, 9 Drawing Sheets

COLOR IMAGE READING APPARATUS

BACKGROUND OF THE INVENTION

The present invention relates to a color image reading apparatus used for a digital color copying machine or the like, and more particularly to a color image reading apparatus employing a CCD linear image sensor.

For reproducing a color image, signals of each color of R, G and B need to be processed. In this case, when a CCD line is provided for each color, the number of pixels of the CCD is caused to be large and the composition is thereby caused to be complex, though the signal processing is simple. Therefore, it is required that the structure of a CCD linear sensor is simplified while the high image quality is kept.

Figure 3:
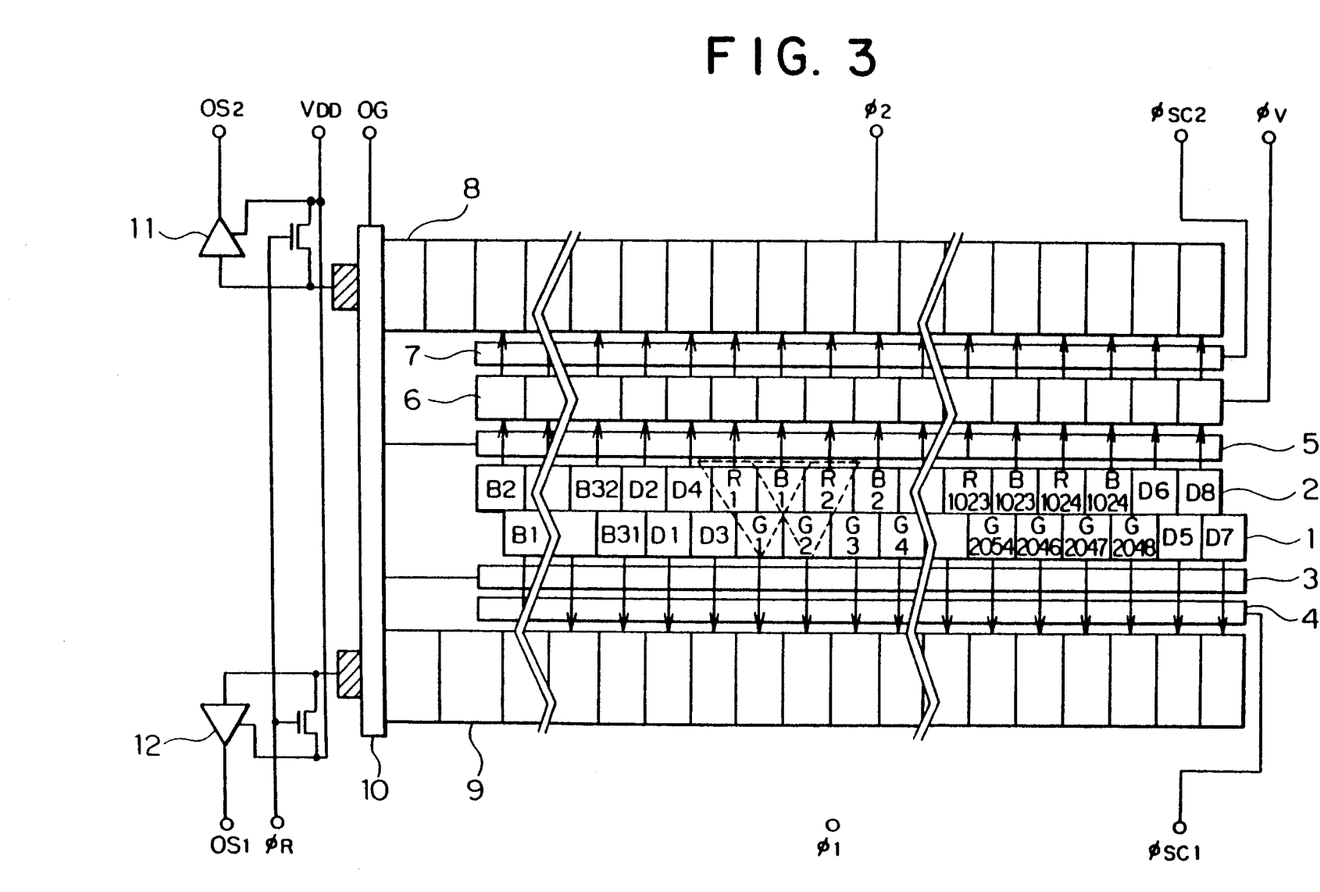
FIG. 3 is a diagram showing constitution of a CCD linear image sensor used in the example in FIG. 1.

With the background mentioned above, inventors of the invention have devised a linear sensor shown in FIG. 3 and studied for utilizing it to practical use.

The CCD linear sensor mentioned above has pixel rows equivalent to two lines in the sub-scanning direction, and one row of them is provided with green filters, and the other is provided with red filters and blue filters each being arranged alternately, and row of each sensor is deviated to that of another by ½ pixel. Owing to the arrangement wherein red pixels and blue pixels are placed alternately, the number of pixels can be reduced, which is an advantageous point. The reason why green pixels equivalent in number to one line are prepared is that green has more influence on eyes of a human being and it has an influence on reproduction accuracy for brightness information.

In the linear sensor, however, there is a difference of reading density between red and blue pixels and green pixels. Therefore, when output signals of each sensor row are processed without being treated, the reproducibility is deteriorated and high image quality can not be expected. It is therefore necessary to create a method for preparing one unit of data by combining output signals of each pixel, and to realize the function of the method.

The invention has been devised based on the above-mentioned consideration, and its object is to attain high image quality of a color image reading apparatus employing a color CCD linear sensor whose structure is simplified.

SUMMARY OF THE INVENTION

Output of green row and those of red and blue rows, both of a CCD linear sensor, are synchronized and generated. For the output, the first pixels for red and blue are combined with the first pixel for green, and the second pixel for red and the first pixel for blue are combined with the second pixel for green for reproduction of color images. Namely, in a color data preparing means, one unit of data is prepared through the combination of output signals based on the following condition 1 for odd number columns of a linear sensor, and the other one unit of data is prepared through the combination of output signals based on the following condition 2 for even number columns of the linear sensor.

Condition 1

Output signals of $(2n+1)$th pixel for green are combined with output signals of $(n+1)$th pixel for red and of $(n+1)$th pixel for blue to prepare one unit of data, wherein n represents natural numbers.

Condition 2

Output signals of 2nth pixel for green are combined with output signals of $(n+1)$th pixel for red and of nth pixel for blue to prepare one unit of data, wherein n represents natural numbers.

For the purpose of realizing data preparation through the combination mentioned above, two latches are provided on a green signal line, and each of a red signal line and a blue signal line is provided with two latches arranged in parallel. In each latch, a trigger edge (a data sampling edge) supplies corresponding clock to the position of each color pixel of a sensor, thus data of each color are taken out in parallel to be combined.

An combination of the first pixel for green (G1), the first pixel for red (R1) and the first pixel for blue (B1) means that data of pixels for red and blue both sandwiching the pixel for green are combined, with the pixel for green as a standard, as shown with dotted lines in FIG. 3 and the relation of the three colors is simplest and it can be specified most clearly. Further, reading density for the pixel for green is not damaged.

In order to realize such combination, it is necessary to cause three colors to exist on time axes concurrently and to compose data of the pixels of the colors when the combination satisfying above mentioned conditions has been realized.

Since red and blue appear only alternately in this case, it is necessary to cause green to delay until the last blue appears, to cause red to maintain its condition until blue appears and to compose three colors when they appear concurrently.

DETAILED DESCRIPTION OF THE INVENTION

The first example of the invention will be explained as follows, referring to drawings.

As shown in FIG. 3, a CCD linear sensor used in the present example is provided with sensor 1 for rows for green, sensor 2 for rows for red and blue, photostorage gates 3 and 5, one-line-delay analog memory 6, shift gates 4 and 7, CCD shift registers 8 for red and blue, CCD shift register 9 for green, output gate 10 and with output buffers 11 and 12. As illustrated, pixels for red and blue are arranged one after the other, and pixels for green are deviated from those for red and blue by half of a pixel. Incidentally, B1-B32 in the figure represent black standard pixels, while D1-D8 represent dummy invalid pixels.

Figure 4:
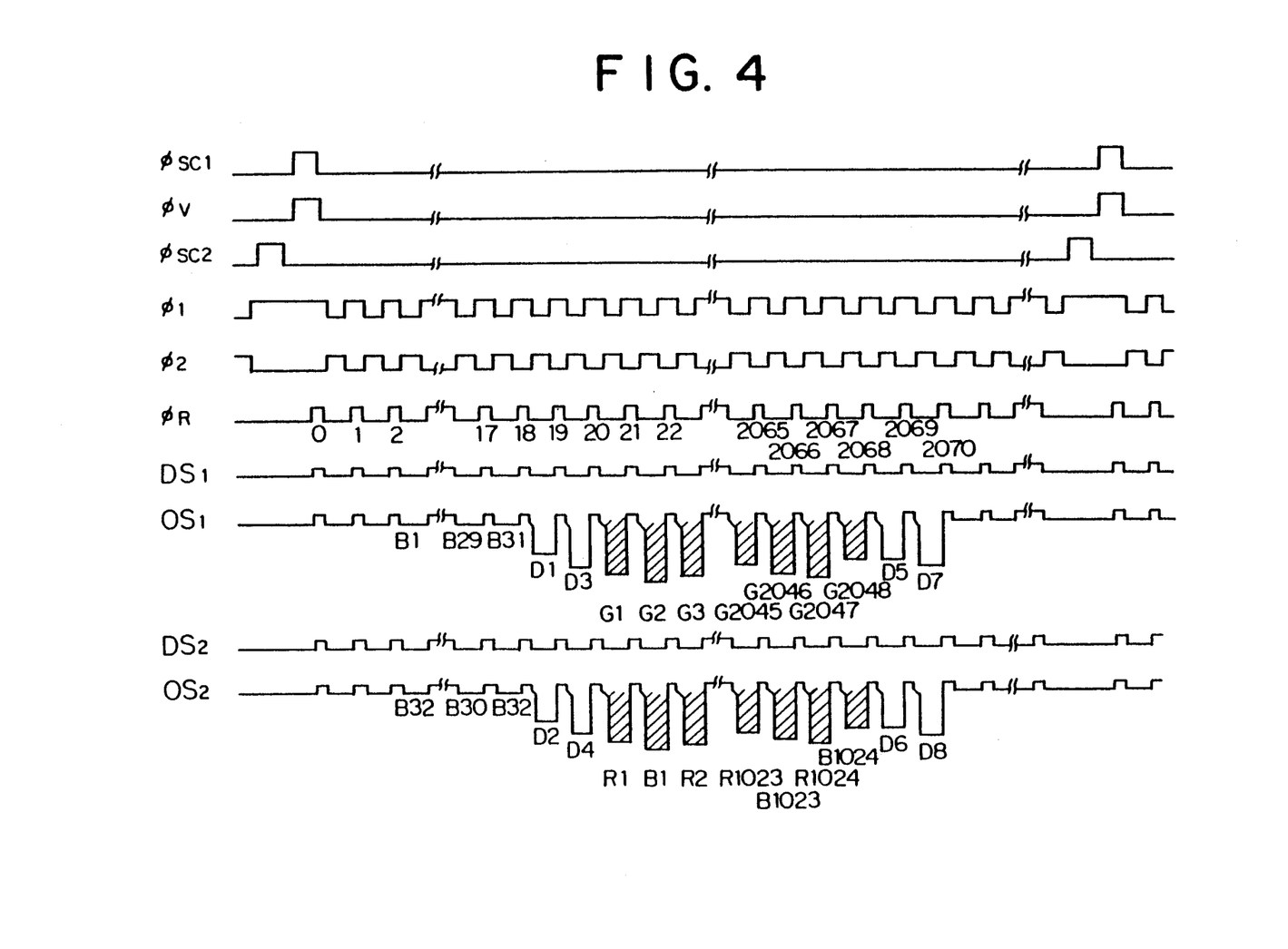
FIG. 4 is a timing chart illustrating actions of the CCD image sensor in FIG. 3.

Electric charges stored through scanning of an optical system (unillustrated) are read in timing shown in FIG. 4.

Namely, $\phi_{sc2}$ reaches a high level first and electric charges of analog memory 6 are transferred to CCD shift register 8 for red and blue, and then $\phi_v$ and $\phi_{sc1}$ reaches a high level and transfer of charges of rows for red and blue to analog memory 6 and transfer of charges of rows for green to CCD shift register 9 for green are carried out.

Next, charges are shifted successively to the horizontal direction (leftward) by $\phi_1$ and $\phi_2$, and signals $OS_1$ and $OS_2$ for each color are generated, synchronizing with $\phi_R$. $OS_2$ represents signals of a preceding line.

Figure 1:
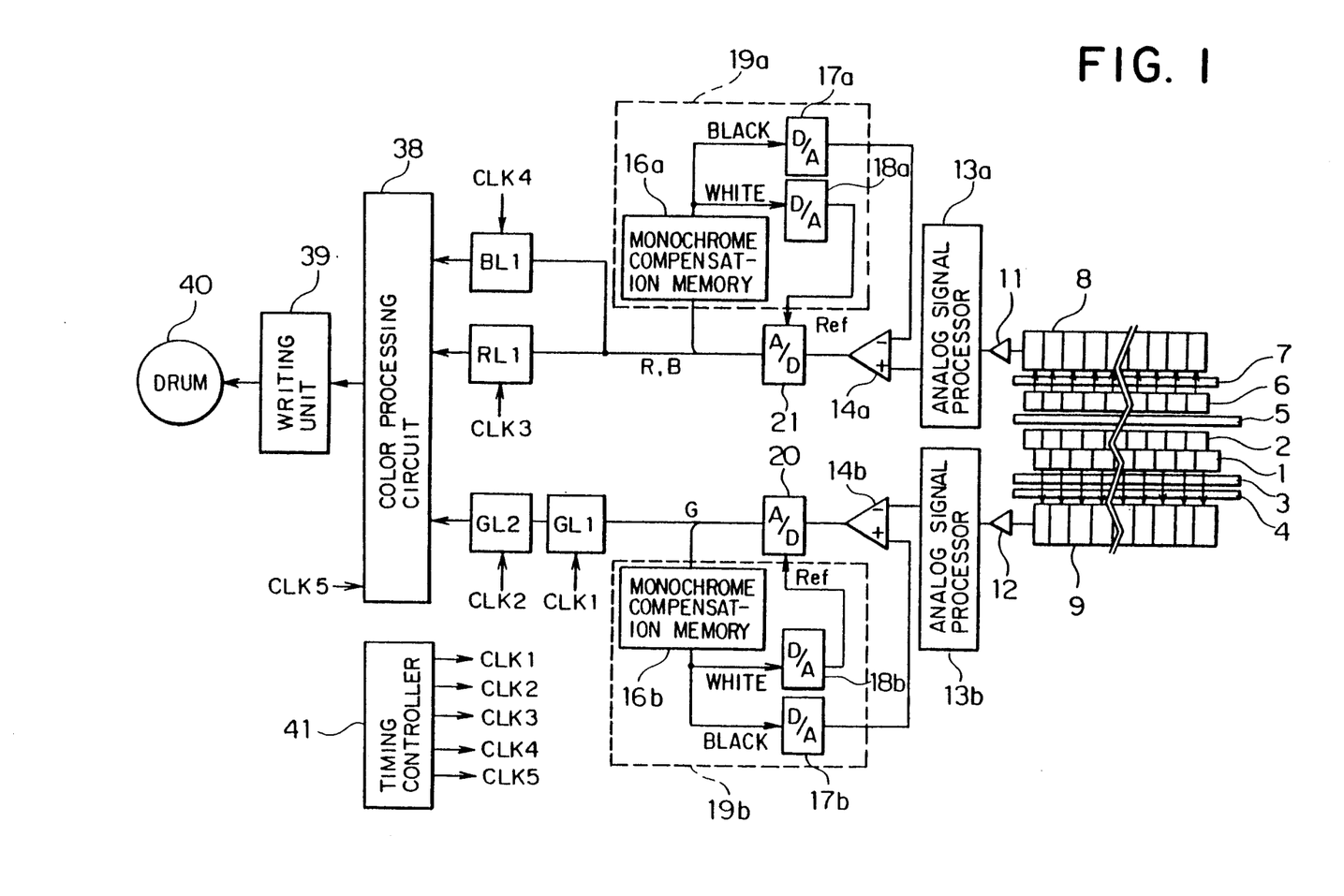
FIG. 1 shows the total constitution of the example of the invention.

FIG. 1 is a diagram showing total constitution of the present example (an example of application to a color copying machine).

Signals generated from shift registers 8 and 9 of a CCD linear image sensor are changed to analog signals by analog signal processing circuits 13a and 13b, and then converted to digital data by A/D converters 20 and 21.

Shading correction circuits 19a and 19b are provided for equalizing luminous intensity distribution and they have black and white correction memories and D/A converters 17a, 17b, 18a and 18b. In the initial stage, the shading correction circuits read black documents and store output levels of each sensor and convert them into analog signals to feed them back to differential amplifiers 14a and 14b, thus amplifying constantly the difference from a black level of each sensor. They further read white documents in the initial stage and store white levels generated by each sensor and input the white levels into A/D converters 20 and 21 as a standard level. The distance between the standard level and the stored black level is divided into predetermined gradation to determine a level of one bit, thus shading correction is made.

Latch RL1 for red and latch BL1 for blue are provided in parallel on the output path of A/D converter 21, and latches GL1 and GL2 for green are arranged in series on the output path of A/D converter, and output signals of each latch are inputted in color processing circuit 38. Clocks generated from timing controller 41 are inputted in each latch and in color processing circuit 38. Writing system (e.g., a system composed of a laser light source for writing, a polygon mirror and lens) 39 receives processed output from color processing circuit 38 and writes on photoreceptor drum 40, thus electrostatic latent images are formed. Then, copying is carried out through developing and fixing processing.

Figure 2:
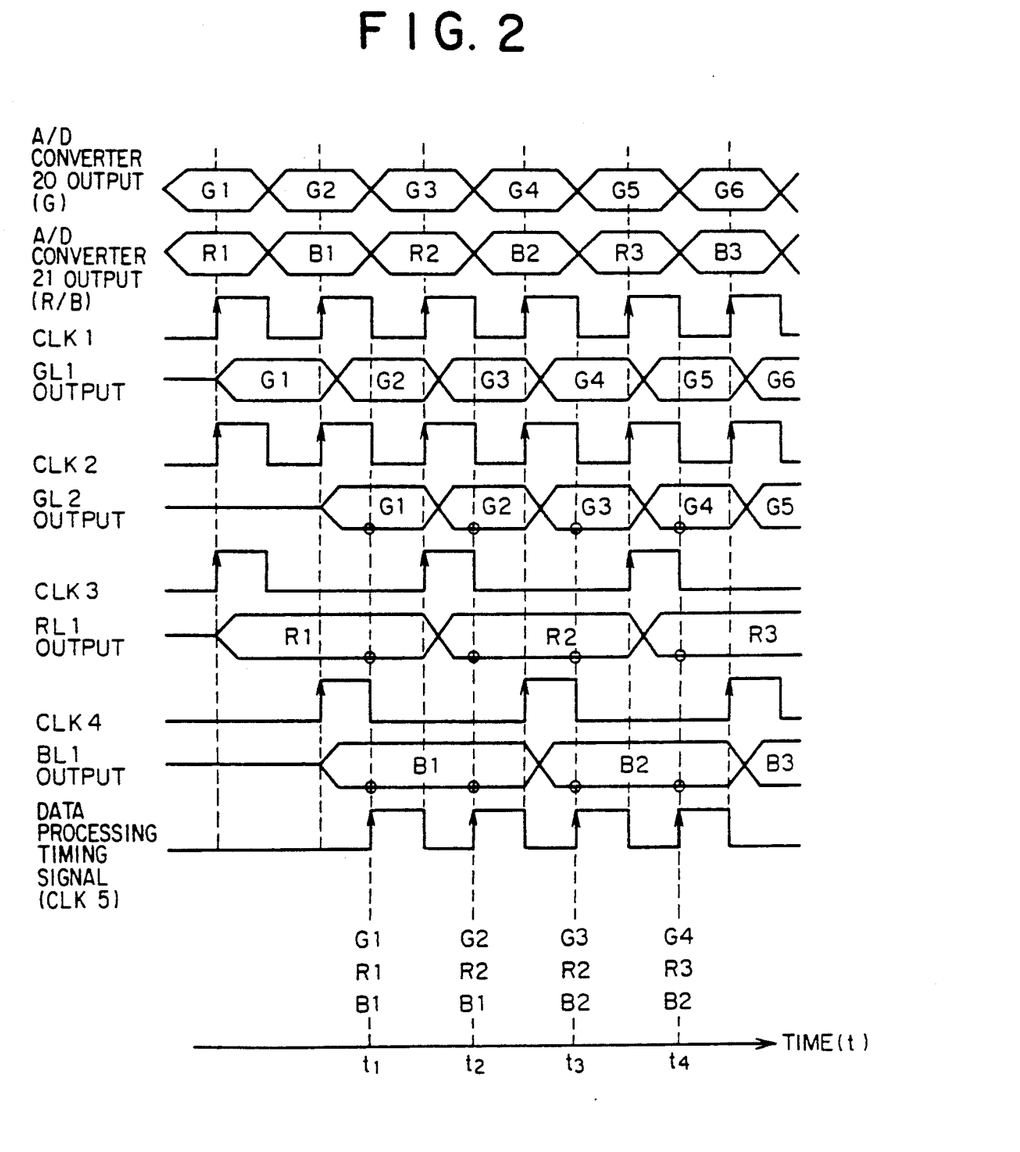
FIG. 2 is a timing chart showing actions of primary portions in the example in FIG. 1.

FIG. 2 is a timing chart showing actions of primary portions in the present example.

Frequency of latch clock CLK3 for red is twice that of shift clocks CLK1 and CLK2 (same phase clock of ½ duty) for green, and a high/low ratio is 1:3. This is the same for latch clock CLK4 for blue. In case of latch clock CLK4, however, its frequency is deviated from that of CLK3 by one frequency of shift clock CLK1. Incidendally, each latch is triggered by a positive edge of clock.

The basic action of the present circuit is that green is delayed until the last blue appears and red is caused to maintain its condition until blue appears because red and blue appear only on an alternate basis, and a combination of three colors is made through sampling of them after they appear concurrently, thus, one unit of data is obtained. As shown in FIG. 2 a combination of processing pixels is made with a standard pixel for green (GL2 output) so that reading density of a pixel for green may not be deteriorated, and G1 (RL1 output) is combined with R1 and B1 (BL1 output), G2 is similarly combined with R2 and B1, and G3 is combined with R2 and B2.

Namely, at the time of t1, the first pixel for green (G1) (see GL2 output), the first pixel for red (R1) (see RL1 output) and the first pixel for blue (B1) (see BL1 output) appear concurrently; therefore, the process timing clock CLK5 is raised to a high level and three data G1, R1 and B1 are taken in color processing circuit 20, thus one unit of data that is a unit for processing is obtained.

Likewise, the combination of G2, R2 and B1 is obtained at the time of t2, the combination of G3, R2 and B2 is obtained at the time of t3 and the combination of G4, R3 and B2 is obtained at the time of t4.

When generalizing a rule for such combination, with regard to odd-numbered columns, output signals of (2n+1)th pixel for green are combined with output signals of (n+1)th pixel for red and of (n+1)th pixel for blue are combined to make one unit of data, and with regard to even-numbered columns of a linear sensor, output signals of 2nth pixel for green are combined with output signals of (n+1)th pixel for red and of nth pixel for blue to make one unit of data.

Figure 5:
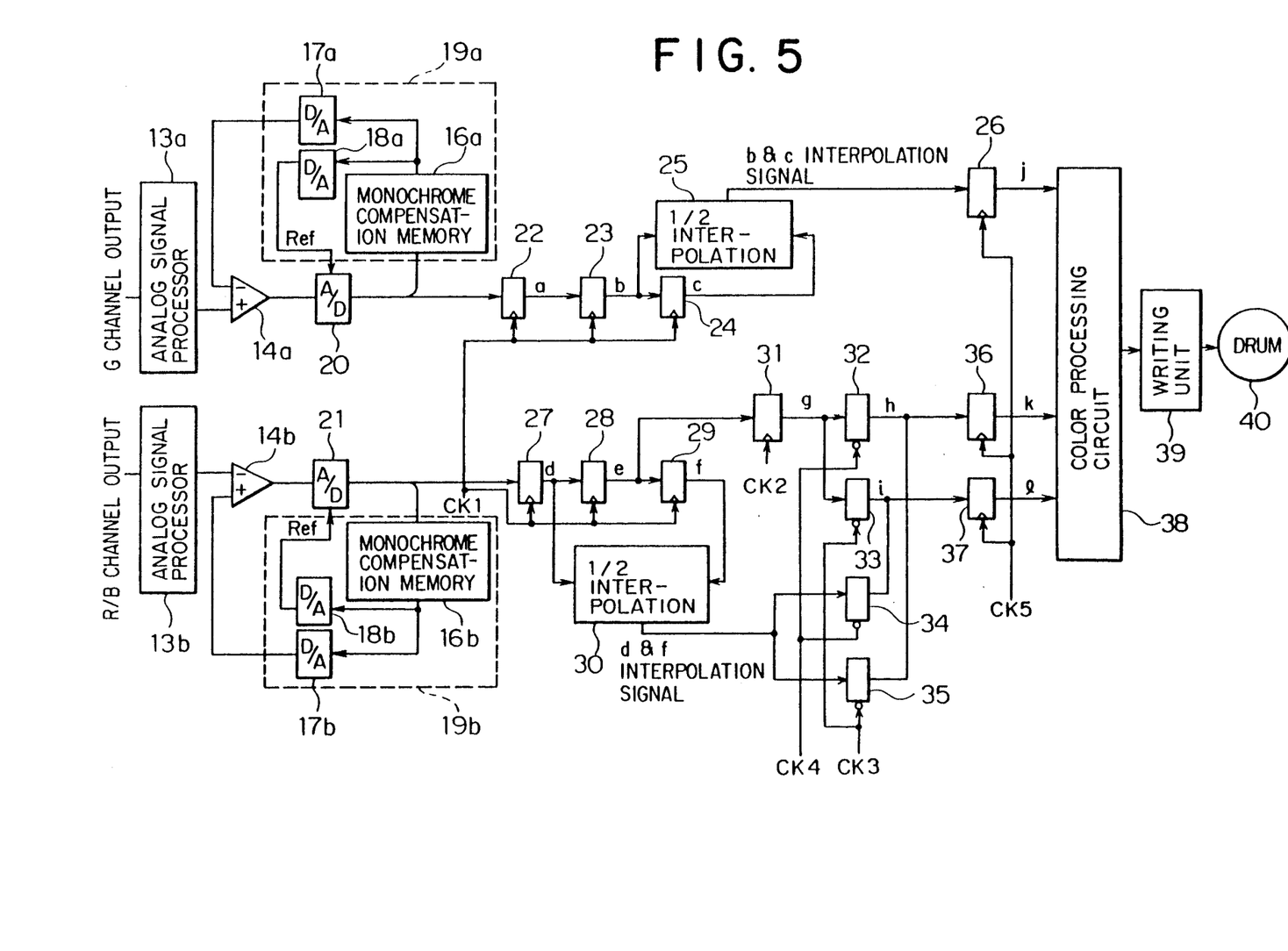
FIG. 5 is a diagram showing total constitution of the second example of the invention.

FIG. 5 is a diagram showing constitution of the second example of the invention. In the example, interpolation processing is made with a standard of G pixel. Incidentally, a linear sensor to be used is the same as that in the first example.

On the output path of A/D converter 20, there are provided in series three-step latches 22, 23 an 24, for green and to the output path of A/D converter 21, there are connected in series three-step latches 27, 28 and 29 for red and blue. Output b of latch 23 on the second step for green and output c of latch (24) on the third step are inputted in interpolation circuit 25 (interpolation coefficient "¼") and its interpolation output is sent to latch 26 for synchronization on the last step. On the other hand, output d of latch 27 on the first step for red and blue and output f of latch 29 on the third step are inputted in interpolation circuit 30 (interpolation coefficient "¼") and its interpolation signals are inputted in tristate output buffers 34 and 35. Output e cf latch 28 on the second step is delayed by latch 31 for delaying by the period of time equivalent to that necessary for interpolation processing and then is inputted in tristate output buffers 32 and 33. Output data n of tristate output buffers 32 and 35 are inputted in latch 36 for synchronization and output data i of tristate output buffers 33 and 34 are inputted in latch 37 for synchronization. Each of latches 22, 23, 24, 27, 28 and 29 is supplied with shift clock CK1, and delay clock CK2 is inputted in latch 31 for delay. Tristate output buffers 32 and 34 and tristate output buffers 33 and 35 are supplied respectively with clock CK4 and clock CK3 both of which are reverse each other in phase, and synchronization clock CK5 is supplied to latches 26, 36 and 37 for synchronization.

Figure 9:
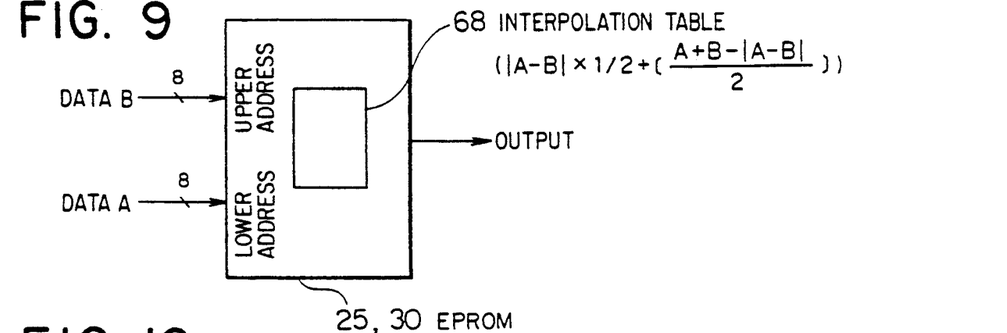
FIG. 9 is a diagram showing constitution of interpolation Circuits 25 and 30 used in the example in FIG. 5.

As a method for interpolating data, there is employed a table-look-up method wherein calculation results are stored and the result corresponding to the input is outputted. Namely, each of interpolating circuits 25 and 30 is composed of EPROM of 8-bit upper and lower input shown in FIG. 9 and has a built-in interpolating table 68 wherein the results of interpolation calculation with interpolation coefficient of "¼" are stored. Namely, the first input data is assumed as A and a following data is B, in the interpolation table 68, there are stored the results of calculation of $|A-B|\times(\frac{1}{4}) +[\{(A+B)-|A-B|\}/2]$ made for input (upper) data B and input (lower) data B.

Figure 6:
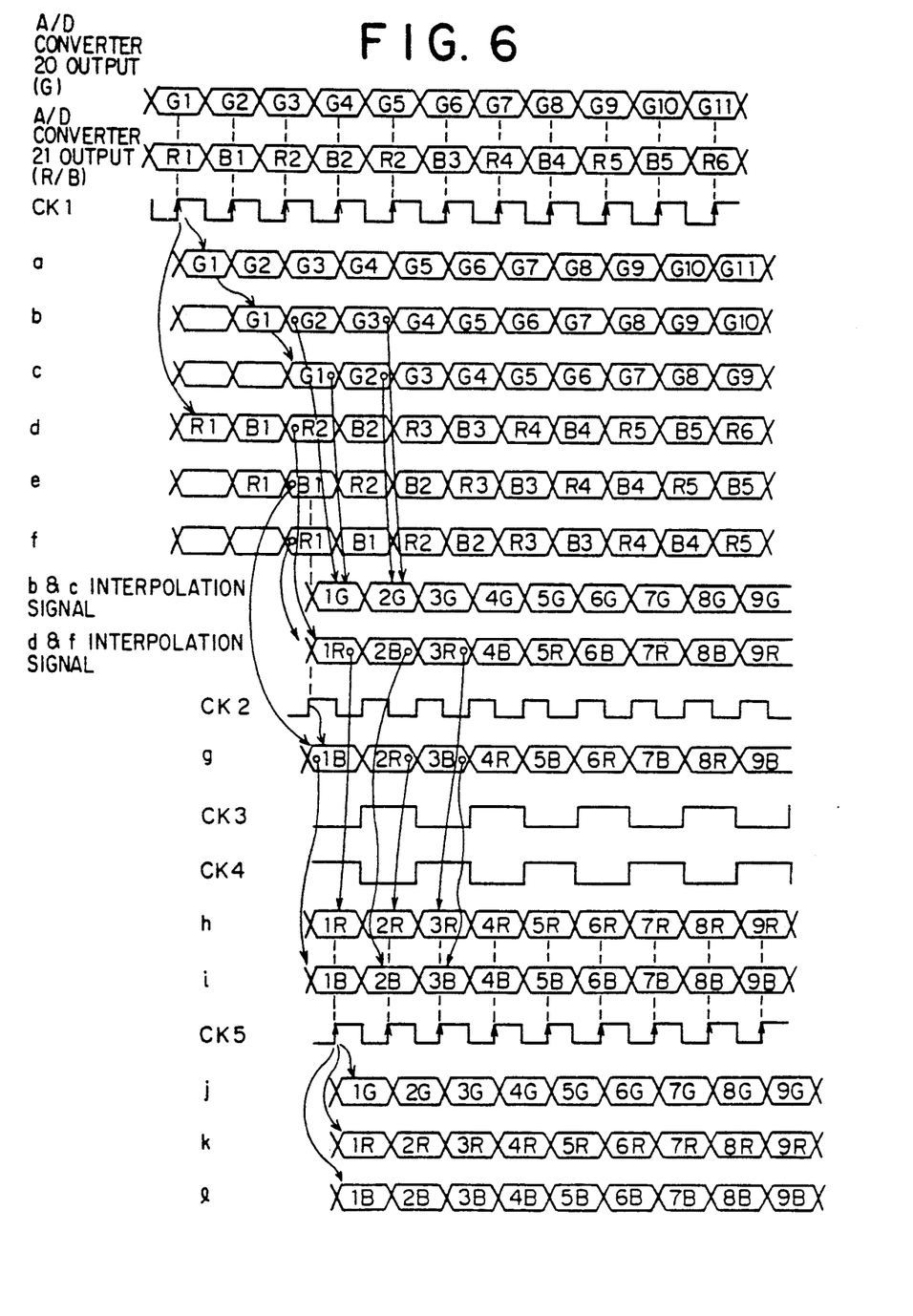
FIG. 6 is a timing chart showing actions in the example in FIG. 5.

Next, actions of the present example will be explained as follows, referring to FIG. 6.

Signals outputted from shift registers 8 and 9 of a CCD linear image sensor are converted to analog signals by analog signal processing circuits 13a and 13b and then are converted to digital data by A/D converters 20 and 21.

Shading correction circuits 19a and 19b are provided for equalizing luminous intensity distribution and they are provided with black and white correction memories 16a and 16b and with D/A converters 17a, 17b, 18a and 18b. In the initial stage, the shading correction circuits read black documents and store output levels of each sensor and convert them into analog signals to feed them back to differential amplifiers 14a and 14b, thus amplifying constantly the difference from a black level of each sensor. They further read white documents in the initial stage and store white levels generated by each sensor and input the white levels into A/D converters 20 and 21 as a standard level. The distance between the standard level and the stored black level is divided into predetermined gradation to determine a level of one bit, thus shading correction is made.

Green (hereinafter referred to as G) output and red and blue (hereinafter referred to as R/B) output both generated from A/D converters 20 and 21 are subjected to three-step shifting made by shift clock CK1 (latch output a, b, c, d, e and f). In this case, a pixel to be a standard is R/B, and R pixel and B pixel are switched alternately for each input. Interpolation for G pixel is calculated by output data (b, c) of latches on the third and second steps. Thereby, interpolation signals 1G, 2G and 3G . . . are produced. Interpolations for R/B pixels are calculated based on output data (d, f) of latches on the third and first steps. As a result of this interpolation processing, interpolation signals 1G, 2G, 3G, 4G . . . are obtained.

Since the interpolation takes some time, data not to be interpolated are delayed for that time (latch 31) and thus delayed output 9 (delayed e, 1B, 2R, 3B, 4R . . . ) are obtained.

Since the interpolation output of R/B and standard pixel output from latch 28 on the second step means repetition of R/B, these two output are switched alternately to obtain output signal n for only R and output signal i for only B. At this stage, combination of signals from each channel for R, G and B becomes possible.

Figure 7:
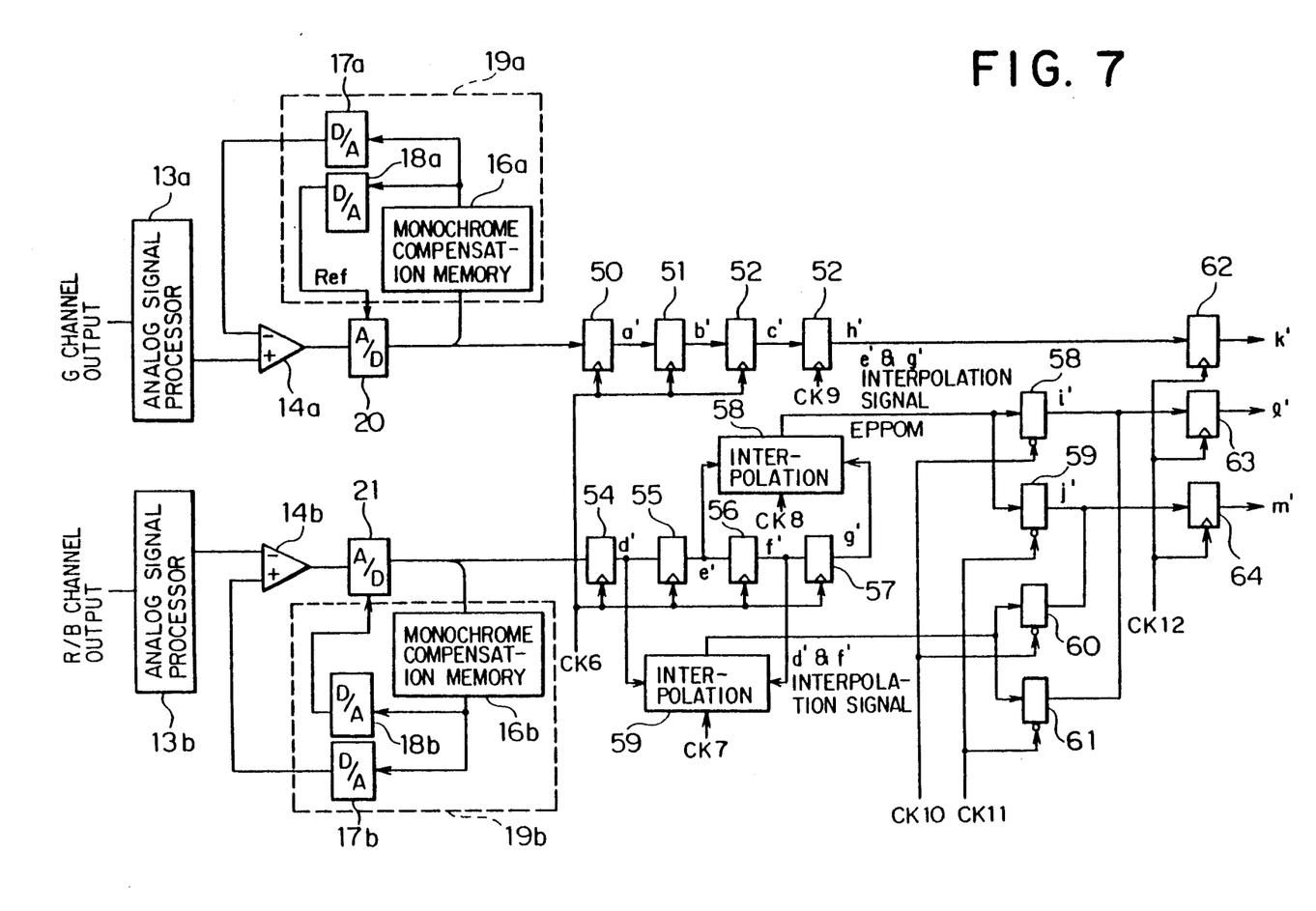
FIG. 7 is a diagram showing constitution of the third example of the invention.

FIG. 7 is a diagram showing the constitution of the third example. In the present example, interpolation processing is carried out with a G pixel as a standard. Linear sensor used in this case is identical to that in the first example.

The present example has therein a 4-step latche combination of latches 50, 51, 52 and 53 provided in a G signal path, a 4-step latche combination of latches 54, 55, 56 and 57 provided in an R/B signal path, interpolation circuits 58 and 59 which interpolate R/B signals, tristate output buffers 58, 59, 60 and 61 and synchronizing latches 62, 63 and 64 in the last stage.

Figure 10:
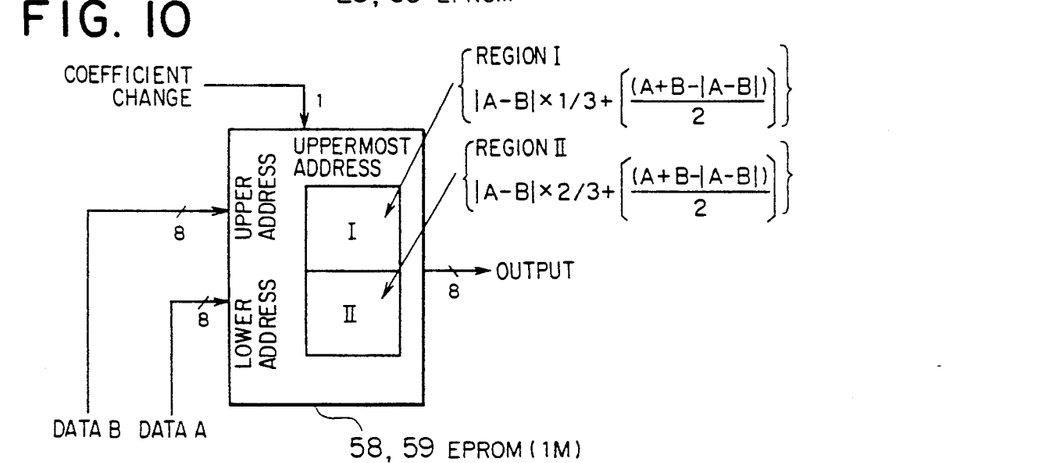
FIG. 10 is a diagram showing constitution of an example of interpolation circuits 58 and 59 used in the example in FIG. 7.

Interpolation coefficient of the interpolation circuits 58 and 59 takes "¼" and "¾" alternately for each processing. Each of these interpolation circuits is composed, for example, of an EPROM having therein a built-in interpolation table as shown in FIG. 10. The interpolation table is composed of region I with an interpolation coefficient of "¼" and region II with that of "¾" both of which are switched alternately by means of an input switching bit. In the region I, the results of calculation of $|A-B|\times(\frac{1}{4})+[\{(A+B)-|A-B|\}/2]$ made for input (upper) data B and input (lower) data B are stored. In the region II, on the other hand, the results of calculation of $|A-B|\times(\frac{3}{4})+[\{(A+B)-|A-B|\}/2]$ are stored.

Figure 11:
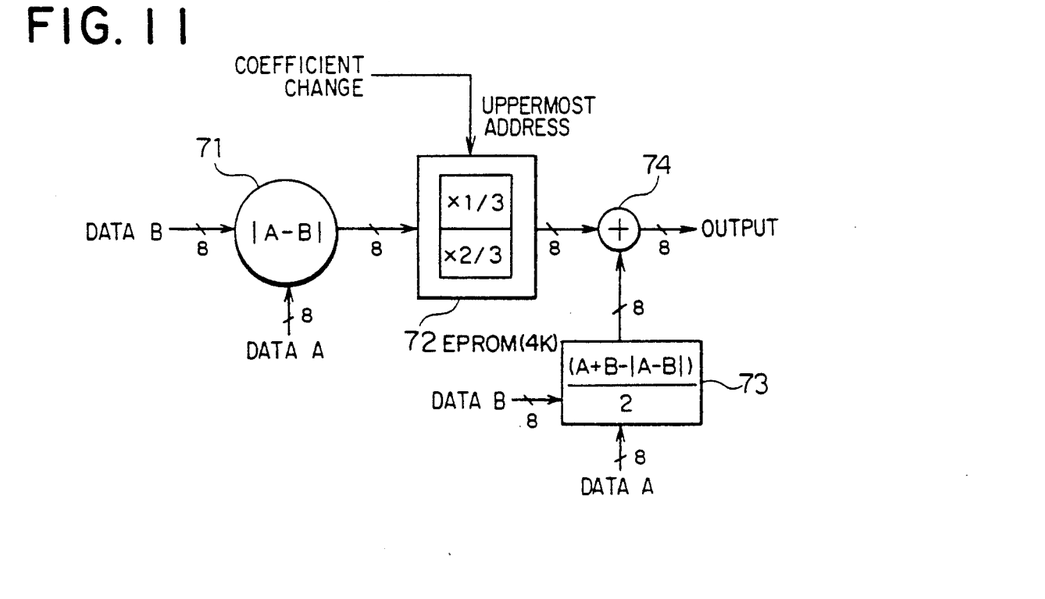
FIG. 11 is a diagram showing constitution of other example of interpolation circuits 58 and 59 used in the example in FIG. 7.

The interpolation circuits 58 and 59 can further be composed as shown in FIG. 11. Namely, calculation of $|A-B|$ is made first in subtracter 71 and then the figure thus obtained is multiplied by an interpolation coefficient by the use of the built-in table in EPROM 72. To the output thus obtained, the calculation output $\{(A+B)-|A-B|\}/2$ by means of calculation circuit 73 is then added in adder 74, thus interpolation output is obtained.

Figure 8:
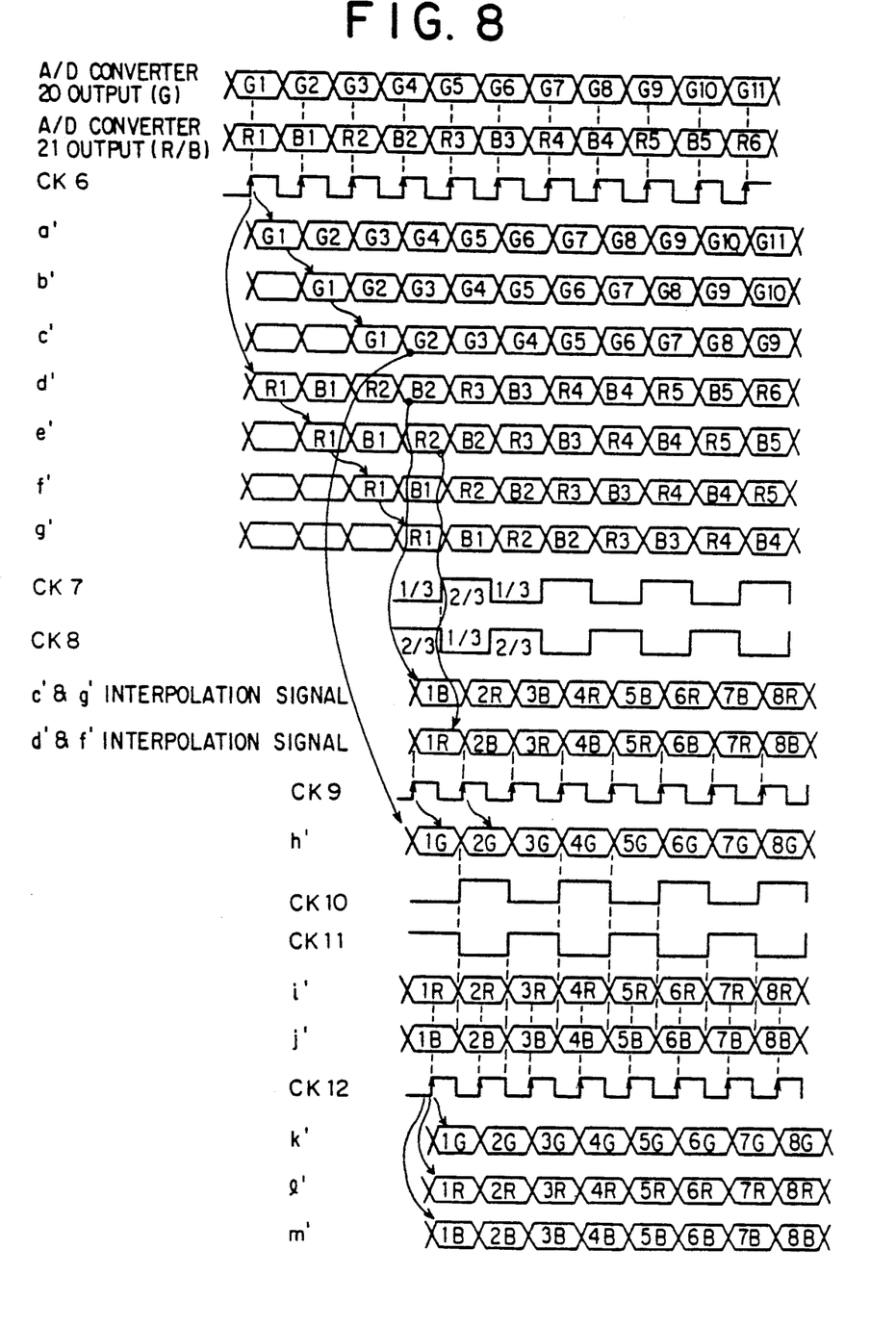
FIG. 8 is a timing chart showing actions in the example in FIG. 7.

Next, actions of the present example will be explained as follows, referring to FIG. 8.

A/D-converted G output and R/B output are subjected to 4-step shift made by shift clock CK6 (latch output a'-g').

Interpolation of R/B relates to two systems; one is a group of output of latches in the fourth step and the second step, and the other is a group of output of latches in the third step and the first step.

In the interpolation processing of two systems, interpolation coefficients of "¼" and "¾" are switched alternately for each processing on an interpolating basis. The switching is made by switching clock CK7 and CK8 both with opposite phase each other.

Since interpolation processing takes some time, G data are delayed by clock CK9 by a period of time equivalent to the aforementioned time.

Interpolated data, since R/B appears alternately for each bit, are switched by clocks CK10 and CK11, thus output of only R (i')and output of only B (g') are obtained. After output of channels R, G and B become ready, they are synchronized by synchronizing clock CK12 and are sent to color processing circuit 38.

In the aforementioned example, the invention is applied on a color copying machine. However, the invention can be applied also to a color facsimile equipment and a color scanner, without being limited to the aforesaid example.

As stated above, the invention provides the following effects.

(1) Owing to interpolation processing, it is possible to match reading density for red and blue pixels with that for green pixel, thus data for red, data for green and data for blue which are in the same position in the main scanning direction are obtained and thereby color images with high image quality can be reproduced.

(2) Linear image sensors corresponding to only two lines are enough, which causes simple constitution.

(3) Owing to the foregoing, it is possible to improve performance of a color copying machine and others, while keeping the cost thereof low.

What is claimed is:

1. An image reading apparatus for generating color image signals including a red image signal, a green image signal, and a blue image signal, corresponding to a pixel of an image, the image reading apparatus comprising:

scanning means having a plurality of line sensors for scanning said image, said scanning means including:

(i) a first line sensor having a first plurality of pixel sensors, said first plurality of pixel sensors being positioned serially to form a line, and said first plurality of pixel sensors including a second plurality of red scanning pixel sensors for scanning a red component image of said image and for forming a red component signal, and a third plurality of blue scanning pixel sensors for scanning a blue component image of said image and for forming a blue component signal;

alternate ones of said first plurality of pixel sensors, being said second plurality of red scanning pixel sensors; and remaining ones of said first plurality of pixel sensors being said third plurality of blue scanning pixel sensors; and (ii) a second line sensor having a fourth plurality of pixel sensors, equal in number to said first plurality of pixel sensors, said fourth plurality of pixel sensors having green scanning pixel sensors for scanning a green component image of said image and for forming a green component signal;

said first line sensor and said second line sensor being positioned parallel to each other and such that each of said first plurality of pixel sensors is respectively shifted by half a length of a pixel relative to each of said fourth plurality of pixel sensors, when said first and fourth pluralities of pixel sensors are counted in a primary scanning direction of said scanning means;

said pixel sensors of said parallel positioned first and second line sensors forming a plurality of pixel sensor columns in a plane that is substantially perpendicular to said primary scanning direction;

color image signal generating means for generating said color image signals corresponding to said image, said color image signal generating means including: means for generating said green image signal based on said green component signal, means for generating said red image signal based on said red component signal, and means for generating said blue image signal based on said blue component signal; and combining means for respectively combining outputs of odd and even numbered columns of said plurality of pixel sensor columns, such that:

(A) when a plurality of outputs of said pixel sensors forming one of said odd numbered columns of pixel sensors is being combined:

said red image signal is provided from a red scanning pixel location n+1, in said first line sensor, when only said second plurality of red scanning pixels is counted in said primary scanning direction, where n is a natural number;

said blue image signal is provided from a blue scanning pixel location n+1, in said first line sensor, when only said third plurality of blue scanning pixels is counted in said primary scanning direction; and said red and blue image signals being combined by said combining means, when said green image signal is provided from said fourth plurality of pixel sensors at a green pixel location 2n+1 in said second line sensor and when said fourth plurality of green scanning pixels is counted in said primary scanning direction; and (B) when a plurality of outputs of said pixel sensors forming one of said even numbered columns of pixel sensors is being combined:

said red image signal is provided from said red scanning pixel location n+1;

said blue image signal ia provided from a blue scanning pixel location n in said first line sensor, when only said third plurality of blue scanning pixels is counted in said primary scanning direction; and said red and blue image signals being combined by said combining means when said green image signal is provided form said fourth plurality of pixel sensors at a green scanning pixel location 2n in said second line sensor and when said fourth plurality of sensors having said green scanning pixels is counted in said primary scanning direction, to thereby form said pixel of said image.

2. The apparatus of claim 1, wherein said color image signal generating means further comprises:

first converging means for respectively converting said red component signal and said blue component signal to a digital red component signal and a digital blue component signal;

second converting means for converting said green component signal to a digital green component signal;

processing means for processing said digital red component signal, said digital blue component signal, and said digital green component signal to respectively provide said red image signal, said blue image signal, and said green image signal;

first storing means for storing said digital red component signal;

second storing means, for storing said digital blue component signal;

third storing means for storing said digital green component signal; and supply means for supplying said digital red component signal, said digital blue component signal, and said digital green component signal simultaneously to said processing means.

3. The apparatus of claim 2, wherein said color image signal generating means further comprises:

means for interpolating said digital red component signal according to a formula:

$$|A - B| \times \frac{1}{2} + \left( \frac{A + B - |A - B|}{2} \right)$$

wherein A and B respectively represent signals within said digital red component signal and B represents a signal that follows the A signal;

means for interpolating said digital blue component signal with a formula:

$$|A' - B'| \times \frac{1}{2} + \left( \frac{A' + B' - |A' - B'|}{2} \right)$$

wherein A' and B' respectively represent signals within said digital blue component signal and B' represents a signal that follows the A' signal; and means for interpolating said digital green component signal with a formula:

$$|A'' - B''| \times \frac{1}{2} + \left(\frac{A'' + B'' - |A'' - B''|}{2}\right)$$

wherein A'' and B'' respectively represent signals within said digital green component signal and B'' represents a signal that follows the A'' signal.

4. The apparatus of claim 2, wherein said color image signal generating means further comprises:

means for interchangeably interpolating said digital red component signal in accordance with the following formula:

$$|A - B| \times \frac{1}{3} + \left(\frac{A + B - |A - B|}{2}\right)$$

and $$|A - B| \times \frac{2}{3} + \left(\frac{A + B - |A - B|}{2}\right)$$

wherein A and B respectively represent signals within said digital red component signal and B represents a signal that follows the A signal; and means for interchangeably interpolating said digital blue component signal in accordance with the following formulas:

$$|A' - B'| \times \frac{1}{3} + \left(\frac{A' + B' - |A' - B'|}{2}\right)$$

and $$|A' - B'| \times \frac{2}{3} + \left(\frac{A' + B' - |A' - B'|}{2}\right)$$

wherein A' and B' respectively represent signals within said digital blue component signal and B' represents a signal that follows said A' signal.

* * * * *